(12) United States Patent
Matsui et al.

(10) Patent No.: US 8,963,852 B2
(45) Date of Patent: Feb. 24, 2015

(54) TOUCH PANEL, DRIVING METHOD FOR THE TOUCH PANEL, PROGRAM FOR GETTING TOUCH INFORMATION, AND MEMORY MEDIA

(75) Inventors: Yoshikazu Matsui, Chu-Nan (TW); Naoki Sumi, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 652 days.

(21) Appl. No.: 13/212,169

(22) Filed: Aug. 17, 2011

(65) Prior Publication Data

US 2012/0044180 A1    Feb. 23, 2012

Related U.S. Application Data

(60) Provisional application No. 61/375,768, filed on Aug. 20, 2010.

(30) Foreign Application Priority Data

Nov. 25, 2010  (JP) ................................. 2010-262496

(51) Int. Cl.
   G06F 3/041     (2006.01)
   G09G 5/00      (2006.01)
   G06F 3/045     (2006.01)
   G06F 3/044     (2006.01)

(52) U.S. Cl.
   CPC .............. *G06F 3/0418* (2013.01); *G06F 3/044* (2013.01)
   USPC ............................ 345/173; 345/156; 345/174

(58) Field of Classification Search
   CPC ...... G06F 3/044; G06F 3/0412; G06F 3/0418
   USPC ............ 345/156–184, 104; 178/18.01–20.04
   See application file for complete search history.

(56) References Cited

U.S. PATENT DOCUMENTS

| | | | | |
|---|---|---|---|---|
| 5,606,346 A | * | 2/1997 | Kai et al. | 345/173 |
| 6,239,788 B1 | * | 5/2001 | Nohno et al. | 345/173 |
| 7,280,167 B2 | * | 10/2007 | Choi et al. | 349/12 |
| 8,044,901 B2 | * | 10/2011 | Yoshihara et al. | 345/87 |
| 8,125,463 B2 | * | 2/2012 | Hotelling et al. | 345/173 |
| 8,817,333 B2 | * | 8/2014 | Okada | 358/406 |
| 2004/0056845 A1 | * | 3/2004 | Harkcom et al. | 345/173 |
| 2004/0174324 A1 | * | 9/2004 | Yamazaki et al. | 345/76 |
| 2010/0020044 A1 | * | 1/2010 | Abileah et al. | 345/175 |
| 2010/0079394 A1 | * | 4/2010 | Tanaka et al. | 345/173 |

(Continued)

FOREIGN PATENT DOCUMENTS

| | | |
|---|---|---|
| JP | 2008-032756 | 2/2008 |
| JP | 2008-198211 | 8/2008 |
| JP | 2009-277116 | 11/2009 |

*Primary Examiner* — Patrick F Marinelli
(74) *Attorney, Agent, or Firm* — Liu & Liu

(57) ABSTRACT

The purpose of the invention is to provide a touch panel, a driving method for the touch panel, a program for getting touch information, and a memory media, capable of reducing the influence caused by the operation of a display device to the touch panel. The touch panel having a display driven by alternative voltage and a touch sensor reading the touch information from the input interface periodically, includes a touch information detection part synchronizing the beginning timing of a reading operation of the touch sensor with a frame of the display and detecting the touch data in each frame, and a touch information calculation part calculating an average with respect to an even number of successive frames to get a calculated touch data corresponding to a predetermined frame.

10 Claims, 18 Drawing Sheets

(56) References Cited

U.S. PATENT DOCUMENTS

| | | | |
|---|---|---|---|
| 2010/0238134 A1* | 9/2010 | Day et al. | 345/174 |
| 2011/0260992 A1* | 10/2011 | Hung et al. | 345/173 |
| 2012/0044180 A1* | 2/2012 | Matsui et al. | 345/173 |
| 2013/0265616 A1* | 10/2013 | Okada | 358/406 |
| 2014/0176509 A1* | 6/2014 | Shin | 345/178 |

* cited by examiner

US 8,963,852 B2

TOUCH PANEL, DRIVING METHOD FOR THE TOUCH PANEL, PROGRAM FOR GETTING TOUCH INFORMATION, AND MEMORY MEDIA

CROSS REFERENCE TO RELATED APPLICATIONS

This application claims the benefit of U.S. Provisional Application No. 61/375,768, filed Aug. 20, 2010, the entirety of which is incorporated by reference herein.

This application claims priority of Japanese Patent Application No. 2010-262496, filed on Nov. 25, 2010, the entirety of which is incorporated by reference herein.

BACKGROUND OF THE INVENTION

1. Field of the Invention

The present invention relates to a touch panel, and in particular relates to a touch panel having a display device driven by alternating voltage and a touch sensor, periodically, reading touch information from an input interface.

2. Description of the Related Art

In a conventional electrostatic capacitive touch panel, a special glass for a touch sensor is not disposed. Transparent electrodes of the touch sensor are directly formed under the color filter of an LCD device and then the touch sensor is embedded into the LCD device. This panel is the so-called in-cell touch panel (refer to Patent document 1).

In comparison to a touch panel with an independent touch sensor substrate, the in-cell touch panel reduces a glass substrate so as to have advantages like compactness, raised transmittance, and low cost.

Patent document 1: Japanese Patent Application Publication no. 2008-32756

However, the touch sensor of the in-cell touch panel is close to an array glass where TFTs (thin film transistors) are formed, so the touch sensor may be influenced by operation of the transistors and coupled noise may be generated. This may result in an issue that detection sensitivity of the touch panel is lowered.

The purpose of the invention is to provide a touch panel, a driving method for a touch panel, a program for obtaining detection information, and a media for storing the program, wherein the noise due to display device driving is lowered and touch inputs can be detected under a high S/N ratio.

BRIEF SUMMARY OF THE INVENTION

To achieve the above purpose, the invention is a touch panel provided with a display driven by an alternating voltage and a touch sensor, periodically, reading touch data from an input interface, comprising a touch data detection part, synchronizing the beginning timing of a reading operation of the touch sensor with a frame of the display and detecting the touch data in each frame; and a touch data calculation part, calculating an average of the touch data with respect to an even number of successive frames to get a calculated touch data corresponding to a predetermined frame.

The invention is a driving method for a touch panel provided with a display driven by alternating voltage and a touch sensor, periodically, reading touch data from an input interface, comprising: a touch data detection step, synchronizing the beginning timing of a reading operation of the touch sensor with a frame of the display and detecting the touch data in each frame; and a touch data calculation step, calculating an average of the touch data with respect to an even number of successive frames to get a calculated touch data corresponding to a predetermined frame.

According to the invention, touch data with less noise can be achieved.

BRIEF DESCRIPTION OF THE DRAWINGS

The present invention can be more fully understood by reading the subsequent detailed description and examples with references made to the accompanying drawings, wherein:

FIG. 5 is a diagram for describing a calculation operation performed by the touch information calculation part, wherein

FIG. 8 shows an example of the touch sensor and the driving method thereof in accordance with the Embodiment 1, wherein

FIG. 12 is a diagram showing an example of the electrode structure of the touch sensor in accordance with the Embodiment 5, wherein

FIG. 13 is a diagram showing a structure of a touch sensor in accordance with the Embodiment 5, wherein

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
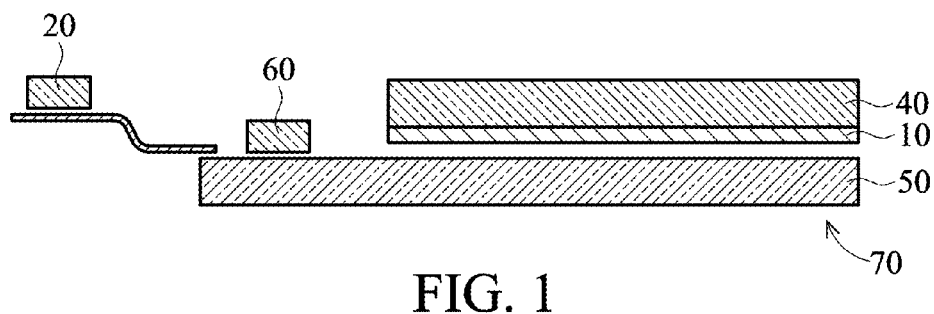
FIG. 1 is a section view of an exemplary structure of a touch panel in accordance with the Embodiment 1.

Embodiment 1:

FIG. 1 is a section view of an exemplary structure of a touch panel in accordance with the Embodiment 1. In FIG. 1, the touch panel comprises a touch sensor 10, a touch sensor controller 20, a color filter glass 40, an array glass 50, and an LCD driving circuit 60.

The touch sensor 10 and the touch sensor controller 20 form a touch sensor module. The color filter glass 40, the array glass 50, and the LCD driving circuit 60 form an LCD device 70. The touch sensor 10 is formed under the color filter glass 40 of the LCD device 70 and is sandwiched by the color filter glass 40 and the array glass 50. The arrangement forms an in-cell touch panel with the touch sensor 10 embedded into the LCD device 70. The touch sensor 10 is formed by, for example, a transparent electrode layer, such as ITO (Indium Tin Oxide), arranged under the color filter glass 40. The in-cell touch panel is not provided with a special substrate for the touch sensor 10 and has advantages like compactness, raised transmittance, and low cost.

The color filter glass 40 and the array glass 50 are filled with liquid crystal therebetween, forming an LCD panel. TFTs are formed on the array glass 50 and driven by the LCD driving circuit 60, thereby displaying images. Here, the touch sensor 10 is very close to the array glass 50 where the TFTs are formed and is easily influenced by noise generated when the TFTs are driven. Particularly, in the case where the touch sensor 10 is an electrostatic capacitive touch sensor, coupled noise is easily generated causing the S/N ratio to lower.

The touch sensor controller 20 is a device for driving and controlling the touch sensor 10. In the touch panel of the embodiment, by the touch sensor controller 20 providing each function described later, a high S/N ration can be realized in the in-cell touch panel shown in FIG. 1.

Figure 2:
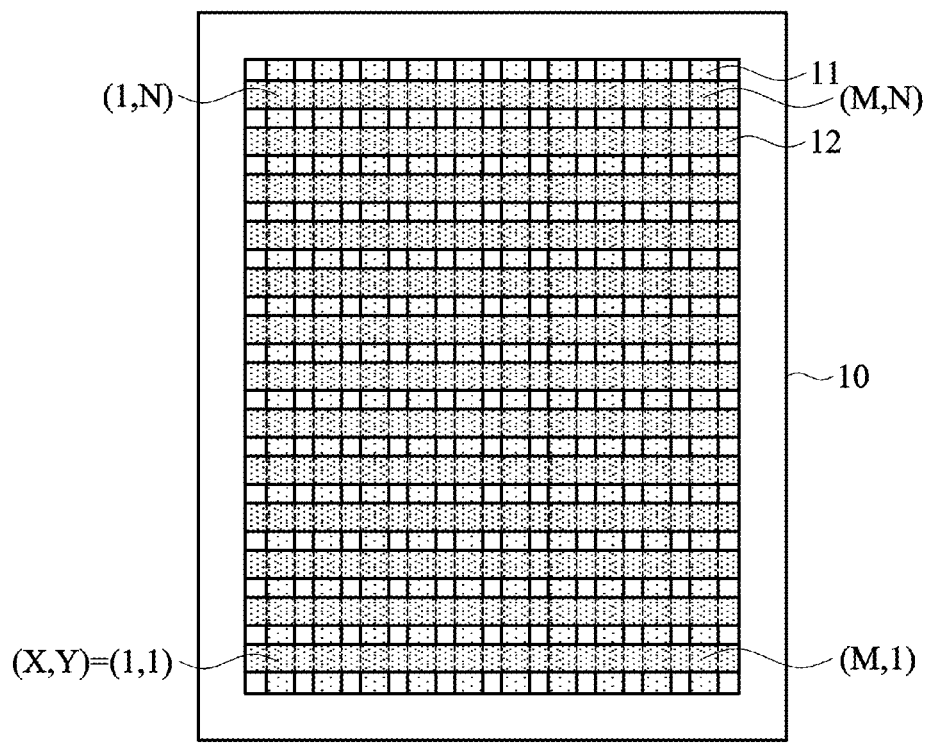
FIG. 2 is a plane view of an exemplary electrode structure of the touch sensor of the touch panel in accordance with the Embodiment 1.

FIG. 2 is a plane view of an exemplary electrode structure of the touch sensor 10 of the touch panel in accordance with the Embodiment 1. X electrodes 11 which extend in the vertical direction and Y electrodes 12 which extend in the horizontal direction are arranged in a form of a matrix in the touch sensor 10. In FIG. 2, there are M lines of X electrodes 11 and N lines of Y electrodes 12. Therefore, an M×N matrix (M columns and N rows) is formed.

The X electrodes 11 and Y electrodes 12 are set with a coordinate system. In FIG. 2, the left bottom corner (X, Y) is (1, 1), the right bottom corner (X, Y) is (M, 1), the left top corner (X, Y) is (1, N), and the right top corner (X, Y) is (M, N). Though depicted on a plane in FIG. 2, the X electrodes 11 and Y electrodes 12 are disposed opposite to each other with a distance therebetween. When a finger or a touch pen contacts the input interface of the touch sensor 10, in the case of an electrostatic capacitive touch sensor, the electrostatic capacitance between the X electrode 11 and Y electrode 12 is varied; and in the case of a resistive film touch panel, detection for conductance is used to find the touch location.

An electrostatic capacitive touch sensor is used as an example to illustrate the invention. In the electrostatic capacitive touch sensor, scanning is performed in the sequence of (1, 1)→(2, 1)→...(M, 1)→(1, 2)→...(M−1, N)→(M, N), and touch information of each coordinate is read out. In this way, when scanning of one electrode line is finished, the next electrode line is going to be scanned. As a result, touch information of all coordinates of all electrode lines are read out. Namely, the touch information of the entire input interface (contact surface) of the touch sensor 10 is detected. From touch intensity data capable of confirming existence of a touch, and a corresponding coordinate, the touch location is identified, so the touch information comprises data about touch location. In the case where the touch information is two-valued data, the only the existence of a touch rather than the intensity of the touch can be detected.

Figure 3:
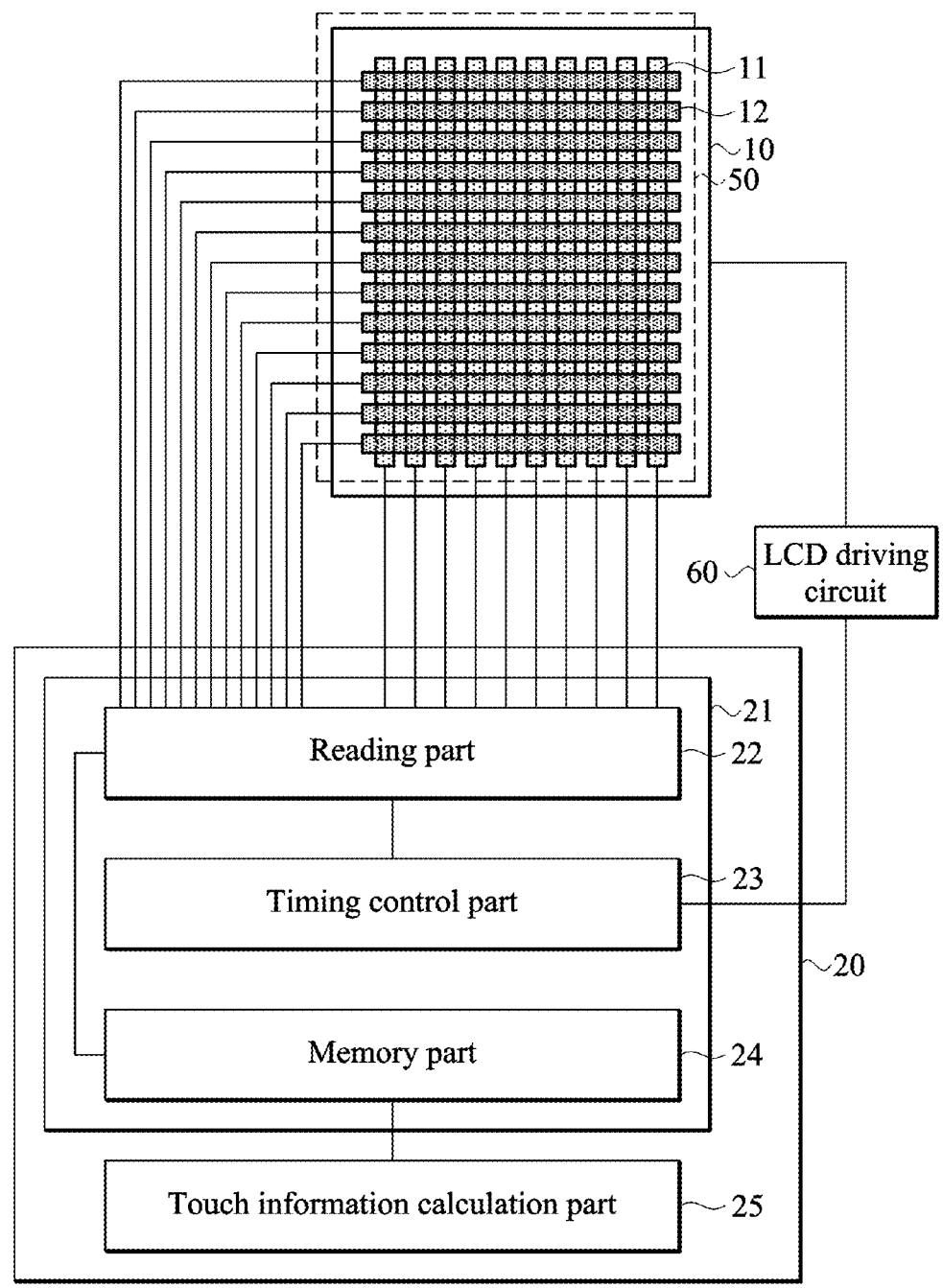
FIG. 3 is a diagram showing an exemplary structure of the touch panel in accordance with the Embodiment 1.

FIG. 3 is a diagram showing an exemplary structure of the touch panel in accordance with the Embodiment 1. In FIG. 3, only elements necessary for realizing the required functions are shown.

In FIG. 3, the input device comprises a touch sensor 10, a touch sensor controller 20, an array glass 50, and an LCD driving circuit 60. The touch sensor 10 comprises X electrodes 11 and Y electrodes 12. The touch sensor controller 20 comprises a touch information detection part 21 and a touch information calculation part 25. The touch information detection part 21 further comprises a reading part 22, a timing control part 23, and a memory part 24.

The touch sensor 10 and the array glass have been described in FIG. 1, so marked with the same reference number, and the description thereof is omitted.

The LCD driving circuit 60 is constituted by a driver IC for driving the LCD device 70. The LCD device 70 of the embodiment is driven in frame inversion.

Figure 4:
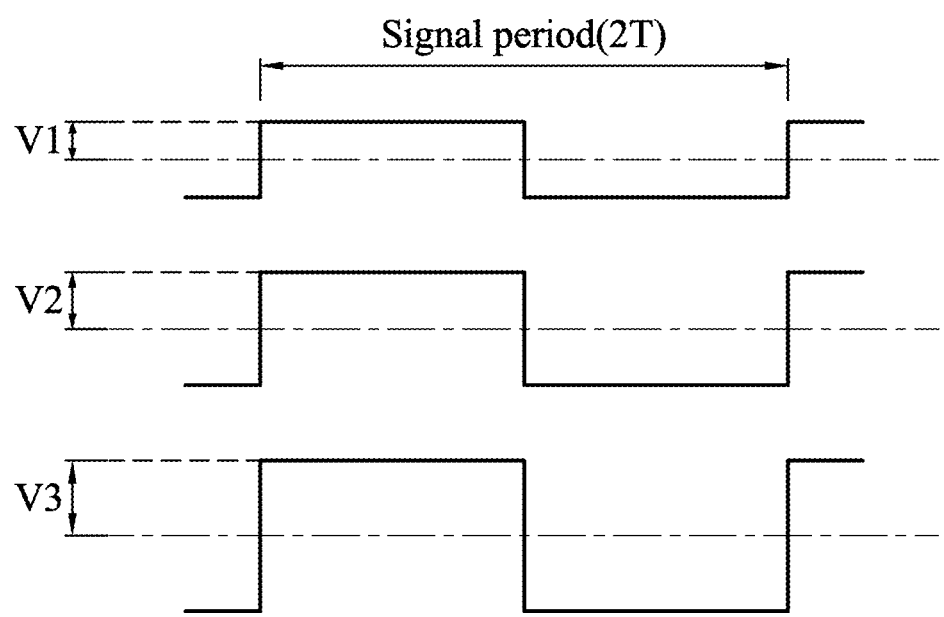
FIG. 4 is a diagram showing data signals applied to the LCD device according to frame inversion.

FIG. 4 is a diagram showing data signals applied to the LCD device according to frame inversion. In FIG. 4, an example of a voltage waveform of a data signal with a 2T period is described. As shown in FIG. 4, voltage of a data signal applied to the LCD device 70 inverts its polarity every period. Though the applied voltage levels (related to brightness) V1, V2, V3 are different, all of them are inverted with the same period T. The period T is equal to a period of a frame of the LCD device 70. Generally speaking, the LCD device 70 is driven with 60 Hz, so the period of a frame is ⅟60= 0.01666...=1.66 msec. Namely, every 16.6 msec the polarity of the applied voltage is inverted and meanwhile the frame is refreshed. In this way, an LCD device 70 displays continuous images.

For easy understanding, frame inversion where all pixel polarities are the same and inverted every frame is taken as an example in the embodiment, but dot inversion where adjacent pixels are inverted to different polarities every frame and line inversion where adjacent pixel lines are inverted to different polarities every frame are included in the invention. No matter what kind of inversion is adopted, for a pixel, its polarity is inverted every frame. That is to say, it is the same in every kind of inversion that a positive voltage of a data signal and a negative voltage of a data signal are applied alternatively. Further, in addition to row inversion where adjacent pixel rows are inverted to different polarities every frame and column inversion where adjacent pixel columns are inverted to different polarities every frame, line inversion comprises other kinds of line inversion such as H line inversion or V line inversion. Dot inversion is not limited to inversion of adjacent pixels. Other kinds of dot inversion such as inversion of every two dots are included.

Referring to FIG. 3, the LCD driving circuit 60 drives the TFTs formed on the array glass 50 so that the LCD device 70 displays one image every 1.66 msec.

The touch information detection part 21 starts the reading operation for the touch sensor 10, which synchronizes with the frame period of the LCD device 70. The touch information of the touch sensor 10 is detected during each frame period. In a conventional touch panel, the LCD driving circuit 60 and the touch sensor controller 20 work independently. However, in the touch panel of the invention, reading operation for touch information of the touch sensor 10 synchronizes with the frame period of the LCD device 70.

Reading part 22 is a device for reading touch information input from the input interface of the touch sensor 10. As the description for FIG. 2, scanning is performed along the Y electrodes or the X electrodes and touch information at each coordinate is read out in sequence. Specifically, touch information is read out by detecting electrostatic capacitance of each line, and then the touch information read out is stored in the memory part 24. The reading part 22 reads all electrodes 11 and 12 to accomplish the scanning of the entire detection surface. Thus, the reading part 22 has a predetermined reading period.

The timing control part 23 is a device for controlling the reading operation of the reading part 22. In the touch panel of the invention, the beginning of the reading operation of the reading part 22 synchronizes with the frame period of the LCD device 70. Thus, the timing control part 23 gets the frame period of the LCD device 70 from the LCD driving circuit 60, and starts the reading operation of the reading part 22, wherein the reading operation synchronizes with the frame period.

The memory part 24 is a device for sequentially storing the touch information read out by the reading part 22. The memory part 24 can be a buffer for which the minimum capacity is large enough to store touch information of a detection surface of the touch sensor 10. If much touch information is detected several times during a frame, the memory part 24 can be a buffer capable of storing more touch information. The memory part 24 can also be formed by a memory commonly used in a computer.

The reading part 22, the timing control part 23, and the memory part 21 form the touch information detection part 21 detecting touch information every frame period of the LCD device 7.

From a plurality of touch data (touch information) read out every frame by the touch information detection part 21, the touch information calculation device 25 calculates an average of a plurality of touch data read out in an even number of continuous frames, to obtain a calculated touch data wherein the noise is offset. The average calculation method can be a shift average method where an average is calculated for each frame from a predetermined number of touch data continuously read out. The average calculation method can also be a total average method where a calculated touch data is not acquired every frame, and a calculated touch data is acquired at a frame in which an even number of continuous touch data are accumulated. That is to say, the shift average method can be adopted if each calculated touch data for each frame needs to be achieved accurately; and the total average method which sets an interval, not a frame period, to calculate an average can be adopted if reducing the number of data to relief calculation burden is preferred. By relieving calculation burden, the scale of a calculation circuit can be minimized and the cost can be lowered. Thus, the touch information calculation part 25 can adopt various kinds of calculation methods according to purpose.

Figure 5A:
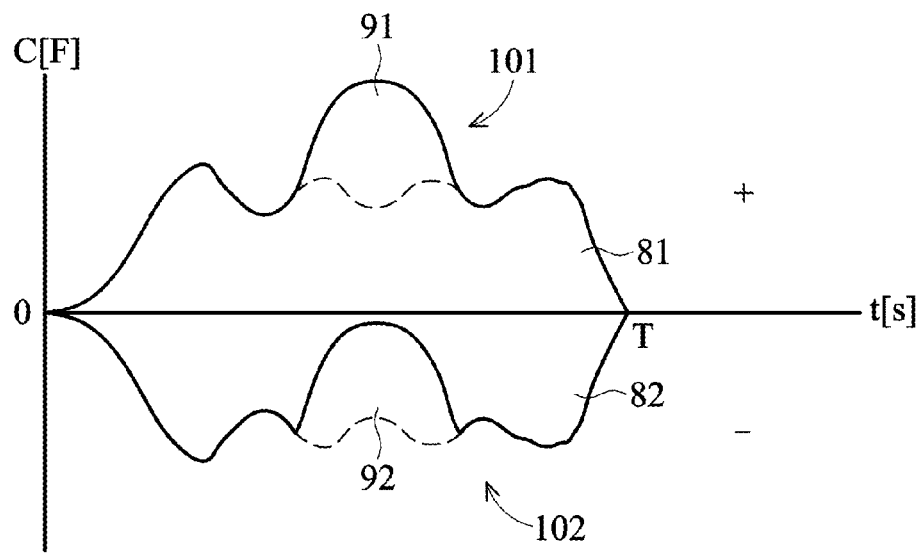
FIG. 5A shows an example of a touch data read out from the touch sensor under noise influence.
Figure 5B:
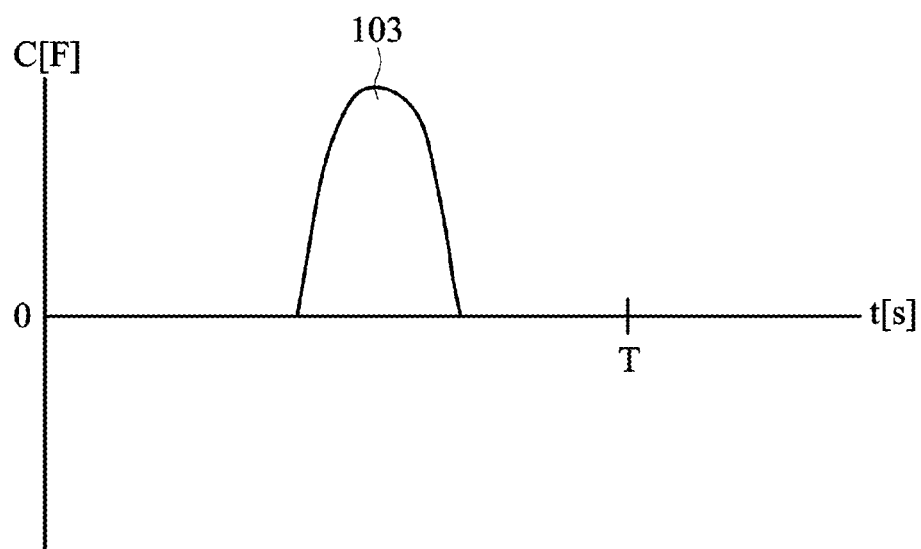
FIG. 5B shows an example of a calculated touch data obtained from the touch information calculation part.

FIG. 5 is a diagram for describing a calculation operation performed by the touch information calculation part 25. FIG. 5A shows an example of a touch data read out from the touch sensor 10 under noise influence. FIG. 5B shows an example of a calculated touch data obtained from the touch information calculation part 25.

In FIG. 5A, when the LCD device 70 is driven with positive polarity, the detection data 101 of the touch sensor 10 is at positive polarity. When the LCD device 70 is driven with negative polarity, the detection data 102 of the touch sensor 10 is at negative polarity. The positive detection data 101 is composed of positive noise 81 due to the LCD device 70 driving and a touch data 91 of the touch sensor 10, and the negative detection data 102 is composed of negative noise 82 due to the LCD device 70 driving and a touch data 92 of the touch sensor 10. Driving with positive polarity and negative polarity are performed in different periods, so the positive detection data 101 and the negative detection data 102 don't appear in the same period. However, for easily understanding, the detection data 101 of the touch sensor 10 during a positive frame and the detection data 102 of the touch sensor 10 during a negative frame are depicted in the same period in FIG. 5A.

In the positive detection data 101 and the negative detection data 102, the touch data 91 detected during a positive frame is influenced by the positive noise 81, and the touch data 92 detected during a negative frame is influenced by the negative noise 82. Namely, the touch data 91 and 92 are influenced by noise of their corresponding frames, respectively.

Here, the positive noise 81 and the negative noise 82 have almost the same waveforms with different polarities. The touch data 91 and 92 have almost the same waveforms and both of them are at positive polarity. Thus, when the positive detection data 101 and the negative detection data 102 are summed up, the positive noise 81 and the negative noise 82 will offset each other and the touch data 91 and 92 will be summed up at positive polarity. As a result, a clear signal without noise is obtained.

FIG. 5B shows a calculated data 103 which is the sum of the detection data 101 and 102. As shown in FIG. 5B, the positive noise 81 and the negative noise 82 offset each other, so the calculated data 103 is the sum of the touch data 91 and 92 without noise.

In this way, the detection data 101 of the touch sensor 10 detected during a positive frame of the LCD device 70 and the detection data 102 of the touch sensor 10 detected during a negative frame of the LCD device 70 are summed up and averaged, so that a noise-offset touch data with high S/N ratio can be obtained.

FIG. 5B shows the waveform of the calculated data 103 without any noise. In the case of displaying a film, because the data applied in each of continuous frames is different, noise is not completely zero. However, it is very rare that extremely different data are applied in continuous frames, so noise is substantially offset.

Back to FIG. 3, the touch information device 25 proceeds with a calculation. As described in FIG. 5, touch data detected synchronously with a positive frame and touch data detected synchronously with a negative frame are summed up, and an average is calculated. Thus, touch information with little noise can be achieved.

In FIG. 3, the touch information detection device 21 and the touch detection calculation device 25 can be various kinds of devices capable of performing the above operations, such as a circuit comprising ASIC (Application Specific Integrated Circuit), a CPU (Center Processing Unit) reading program to work, or a computer. The function of the touch information detection device 21 and the touch detection calculation device 25 can be realized by a program or a computer readable media storing the program.

Figure 6:
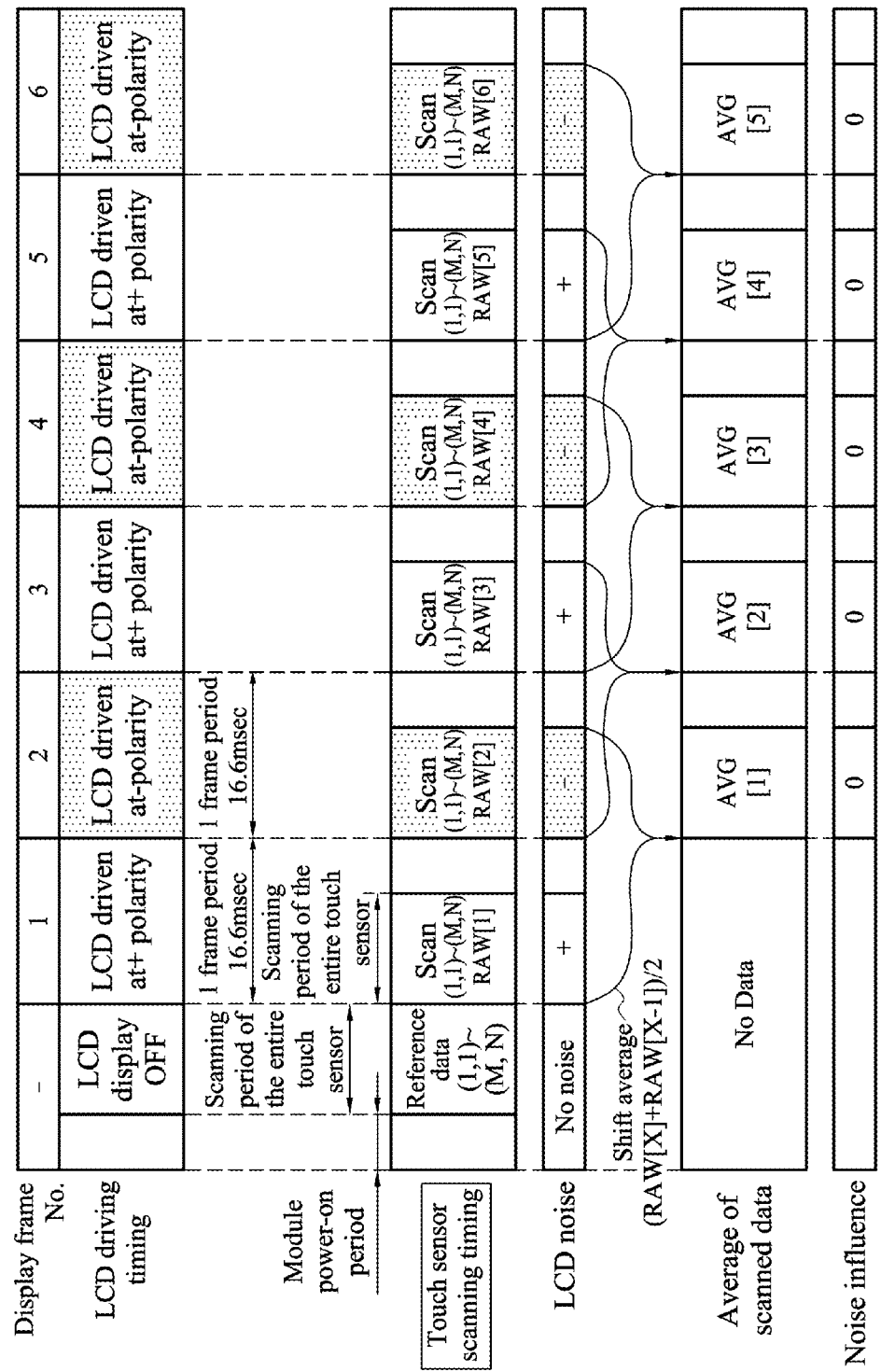
FIG. 6 is a diagram for describing the touch sensor and the driving method thereof in accordance with the Embodiment 1.

FIG. 6 is a diagram for describing the touch sensor and the driving method thereof in accordance with the Embodiment 1. In FIG. 6, working timings of the touch sensor 10 synchronizing with the frame period of the LCD device 70 is shown. Specifically, matching frames and driving timings of the LCD device 70, scanning timings of the touch sensor, noise influence, data averages, and noise influence after calculation are shown.

First, when the display of the LCD device 70 is OFF, the reference scanning data at each coordinate (1, 1) to (M, N) is read out. Reading the reference scanning data is for offsetting natural noise to calibrate the result. The reference scanning data are used later at the time the touch information is calculated. At this phase, the LCD device is not driven, so no noise is generated.

In the first frame, the LCD device 70 is driven by a positive data signal. The touch sensor 10 synchronizes with the beginning of the positive frame and starts reading by the reading part 22 of the touch information detection part 21. The reading operation can be performed by scanning each electrode line in sequence. The timing to start the reading operation of the reading part 22 is controlled by the timing control part 23.

Generally speaking, the data reading period of the touch sensor 10 is shorter than a frame period, 16.6 msec, of the LCD device 70. Because a common reading speed (frequency) is faster than 60 Hz, the reading operation for touch information is finished before the first frame of the LCD device 70 is finished. Here, though the reading is finished, the next reading operation does not start until the first frame of the LCD device 70 is finished. The detection data RAW[1] read out is stored in the memory part 24. Note that this detection data comprises the influence of positive noise of the LCD device 70.

In the second frame, the LCD device 70 is driven by a negative data signal. The touch sensor 10 synchronizes with the beginning of the negative frame and starts a reading operation. At this time, the touch data is influenced by negative noise of the LCD device 70. From the detection data RAW[2] read out and the data RAW[1] stored in the memory part 24, a shift average (RAW[1]+RAW[2])/2 is calculated by the touch information calculation part 25, and considered as a detection data average AVG[1]. The noise of the detection data average AVG[1] is offset because of the positive driving in the first frame and the negative driving in the second frame. Therefore, a touch data which is not influenced by noise can be achieved.

In the third frame, the LCD device 70 is driven by a positive data signal. As in the first and second frames, the touch sensor 10 synchronizes with the beginning of the positive frame and starts a reading operation to detect the touch data. At this time, the touch data is influenced by positive noise of the LCD device 70. However, if a shift average (RAW[2]+RAW[3])/2 is calculated from the detection data in this frame and the second frame, the positive noise and the negative noise will be offset by each other and a detection data average AVG[2] which is not influenced by noise can be achieved.

Similarly, in the fourth frame wherein a negative data signal is applied, a shift average is calculated from the detection data in this frame and the third frame, and a detection data average AVG[3] is acquired. In the fifth frame wherein a positive data signal is applied, a shift average is calculated from the detection data in this frame and the fourth frame, and a detection data average AVG[4] is acquired. In this way, because any two of the successive frames of the LCD device 70 must be a positive frame and a negative frame, a touch data in which the noise from the LCD device 70 is offset can be achieved by calculating an average of detection data detected in two of the successive frames.

Figure 7:
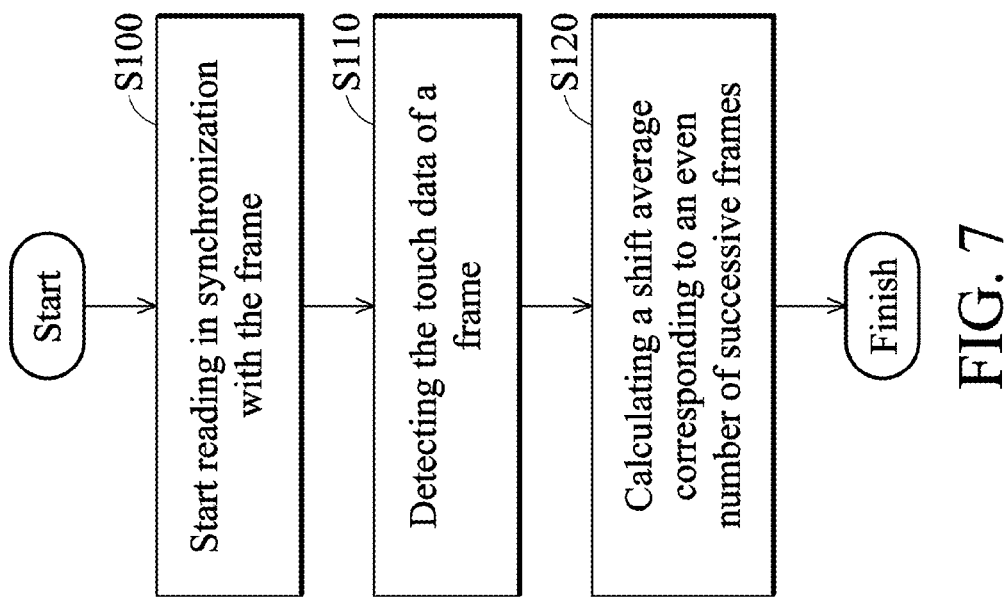
FIG. 7 is a flow chart showing a detection process of a frame of the touch panel and the driving method thereof in accordance with the Embodiment 1.

FIG. 7 is a flow chart showing a detection process of a frame of the touch panel and the driving method thereof in accordance with the Embodiment 1.

At step 100, the touch sensor 10 synchronizes with the frame of the LCD device 70 and starts a reading operation for touch data. The reading operation is performed by the reading part 22 of the touch information detection part 21. The beginning timing of the reading operation is controlled by the timing control part 23. Note that the beginning timing of the reading operation is allowed not to synchronize with the beginning of the frame of the LCD device 70 but to synchronize with a timing delayed from the beginning of the frame. A scanning period of a touch sensor is usually shorter than a frame period of the LCD device 70. Thus, there is no problem as long as the touch data can be detected within each frame period.

At step 110, a touch data of the touch sensor 10 is detected in a frame synchronized with the touch sensor 10. The touch data detected is stored in the memory part 24.

At step 120, a shift average is calculated from detection data detected in an even number of successive frames in each of which a detection operation has been performed at step 110. Because touch data which have been detected are calculation targets, the touch data acquired in frames before the frame in which a detection operation is performed at steps 100 to 110 are calculation targets. Thus, the influence from the noise of the LCD device 70 can be offset, and a touch data with a high S/N ratio can be achieved. Note the calculation for the shift average is performed by the touch information calculation part 25.

In Embodiment 1, a shift average is calculated with respect to two successive frames. However, as long as the number of positive driving frames is equal to the number of negative driving frames, a shift average can be calculated with respect to four successive frames or six successive frames. Note that touch information can be achieved more accurately by increasing the number of touch data for average calculation. Embodiments about increasing the number of frames for average calculation are described later.

By performing steps 100 to 120 in sequence to each frame, touch information with little noise can be achieved.

In Embodiment 1, a shift average is calculated every frame, but a shift average is calculated every two frames comprising a pair of a positive driving frame and a negative driving frame. Though a shift average is calculated once every two frames, in the case where the number of touch data which is a half of the number of frames is enough, it is possible to calculate an average detection data at an interval of two frames. Thus, the calculation burden can be relieved and the structure of the touch information calculation part 25 can be simple. To further reduce the calculation burden, an average detection is allowed to be calculated at an interval of four or six frames, rather than an interval of two frames. There are many choices when choosing an interval as long as the interval for calculating an average is equal to an even number of successive frames.

FIG. 8 shows an example of the touch sensor and the driving method thereof in accordance with the Embodiment 1. FIG. 8A shows a reference data, FIG. 8B shows a touch data in an odd frame of the LCD device 70, FIG. 8C shows a touch data in an even frame of the LCD device 70, and FIG. 8D shows a touch data after an average calculation. Elements identical to the elements described before are marked with the same reference numbers. In each Fig., the horizontal surface represents a coordinate system (X, Y) of the touch sensor, and the vertical axis represents a signal level of the touch sensor.

Figure 8A:
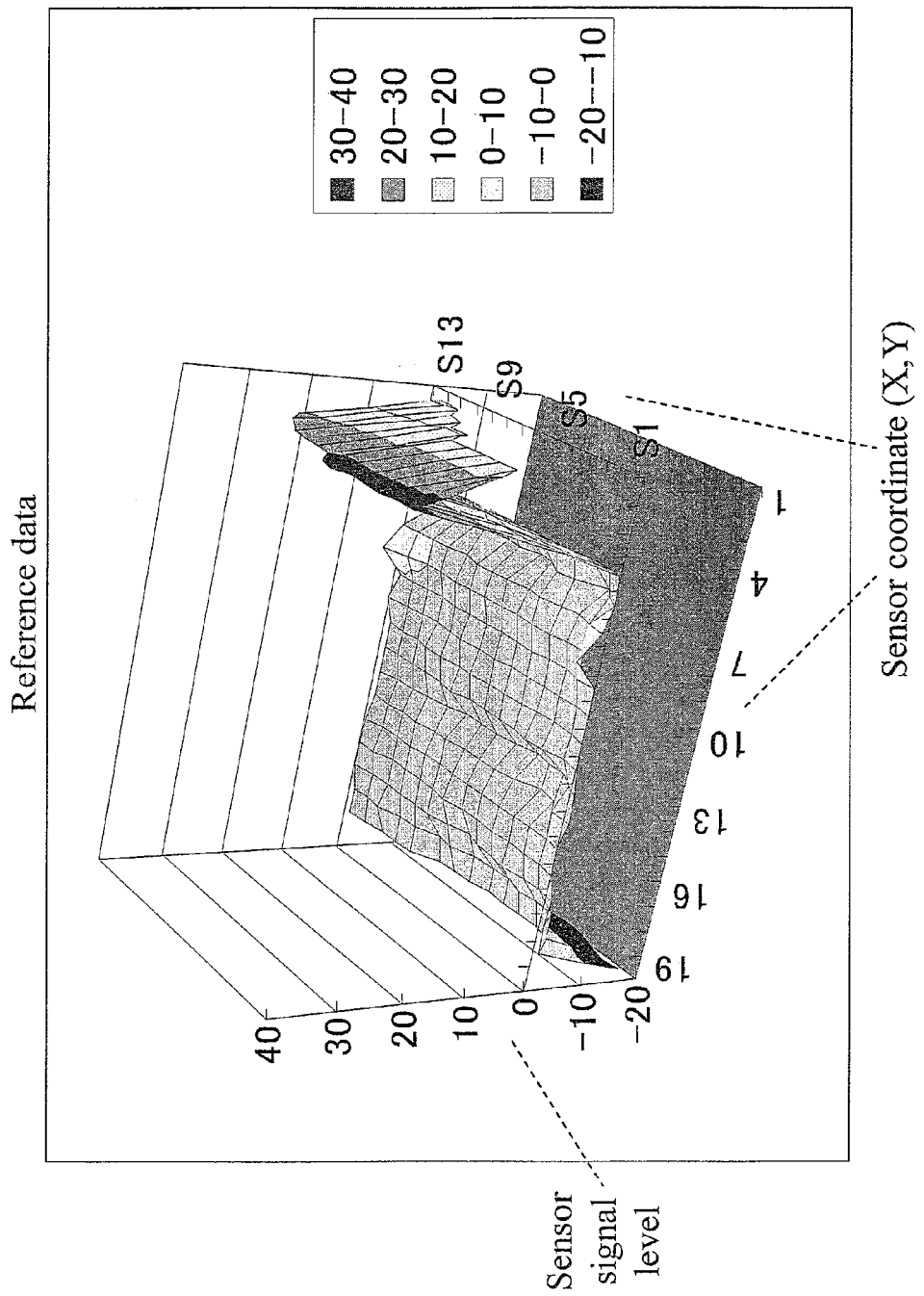
FIG. 8A shows a reference data.

In FIG. 8A, before the LCD device 70 is driven, a reference data is detected. Because the LCD device 70 displaying the input image has not been driven yet, the reference data is detected under a non-contact state which means that no touch is input. Therefore, a condition where signals at each coordinate are zero can be assured.

Figure 8B:
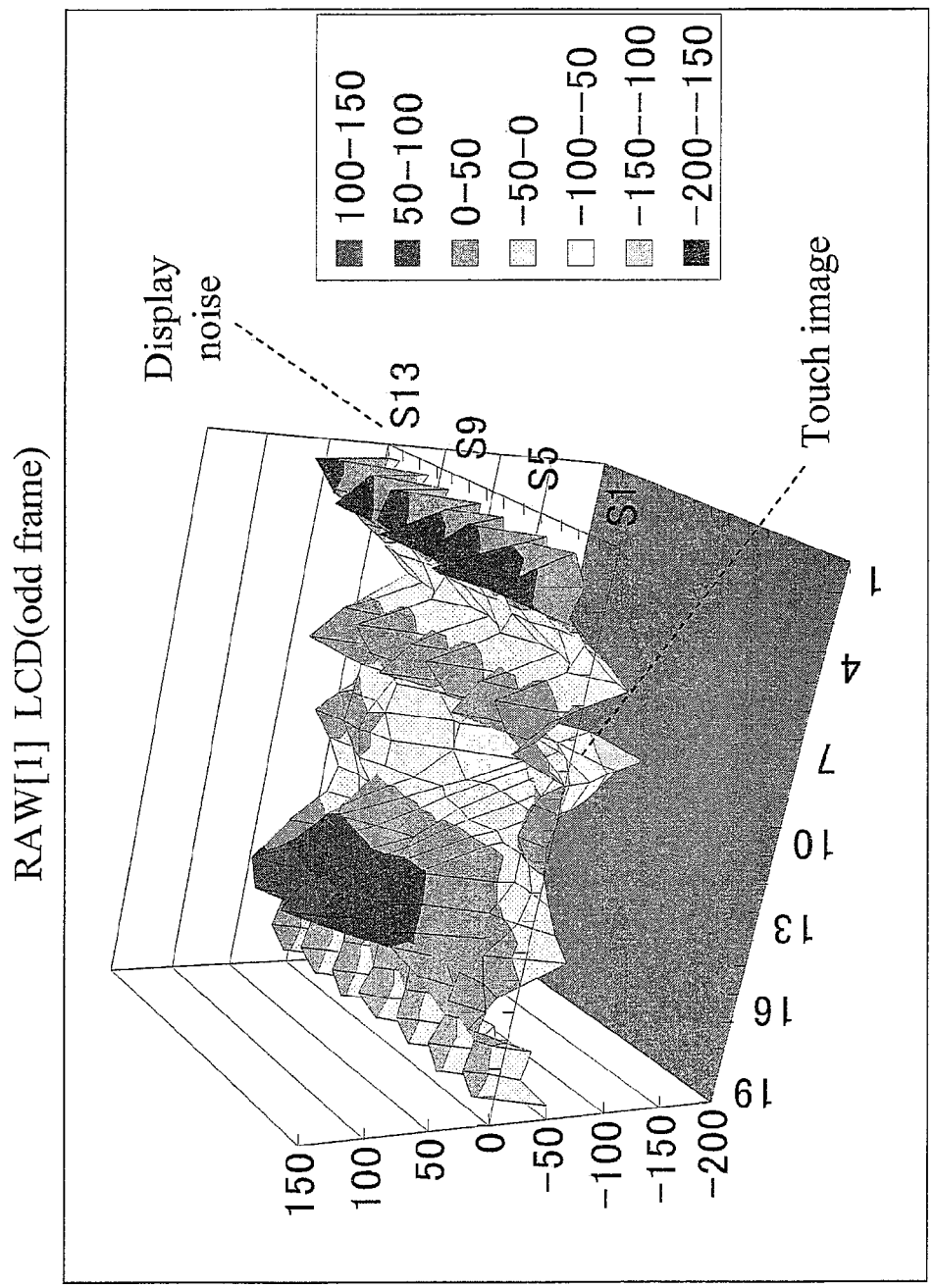
FIG. 8B shows a touch data in an odd frame of the LCD device.
Figure 8C:
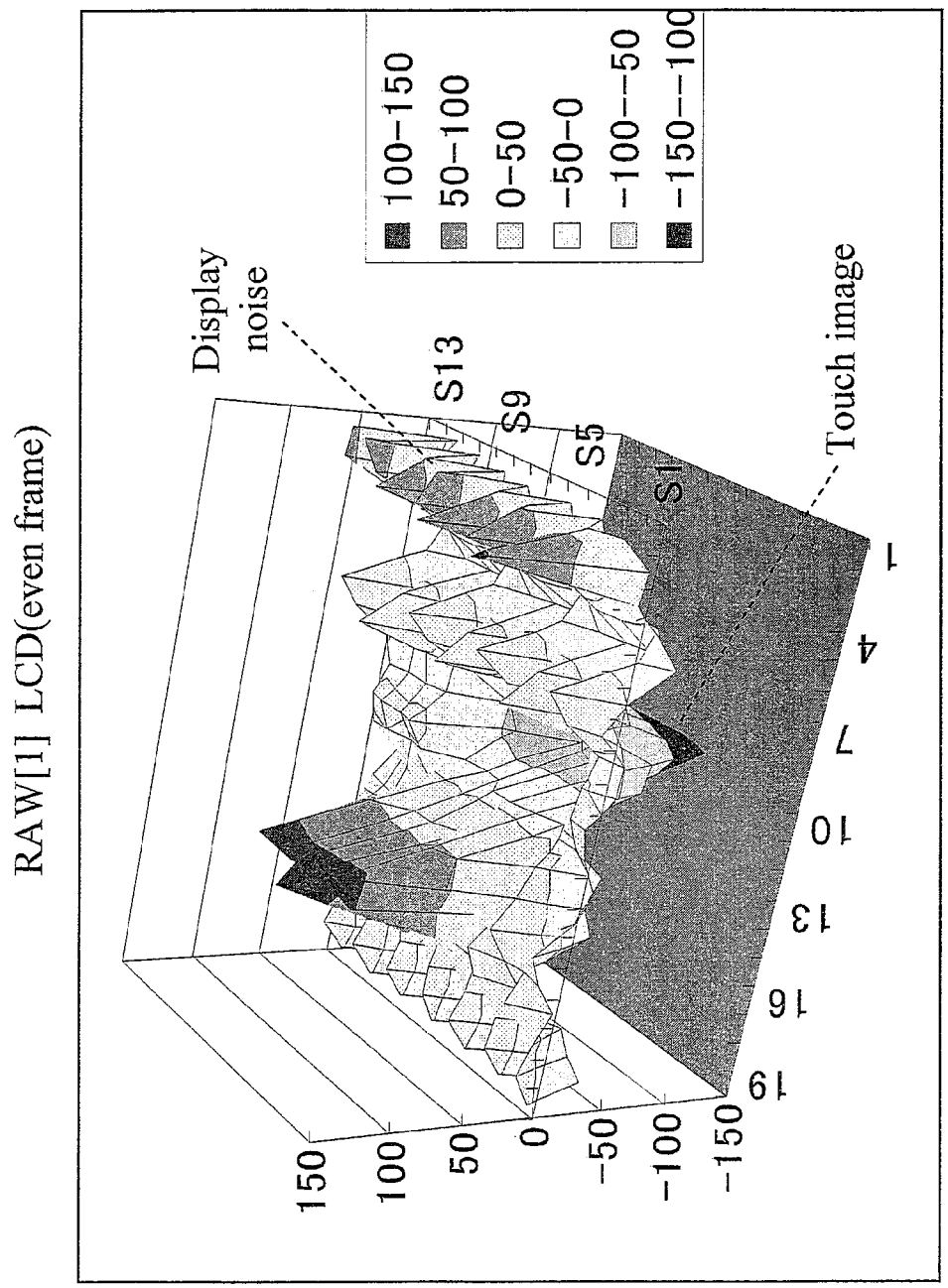
FIG. 8C shows a touch data in an even frame of the LCD device.

FIG. 8B shows the touch data RAW[1] detected in an odd frame of the LCD device 70. FIG. 8C shows the touch data RAW[2] detected in an even frame of the LCD device 70. FIGS. 8B and 8C both show a touch image representing the touch of a finger as a touch data. In comparison with FIGS. 8B and 8C, the touch images in FIGS. 8B and 8C are both located at a coordinate (10) of the axis near the viewer, and the signal levels of the touch sensor in FIGS. 8B and 8C are both negative. On the other hand, concerning the part besides the touch image, peaks in FIGS. 8B and 8C are deviated from each other.

In order to get the touch image without noise, a calculation using a formula such as Formula (1) is performed.

$$\text{Reference data}-(\text{RAW}[1]+\text{RAW}[2])/2=\text{Touch image data without noise.} \quad (1)$$

Figure 8D:
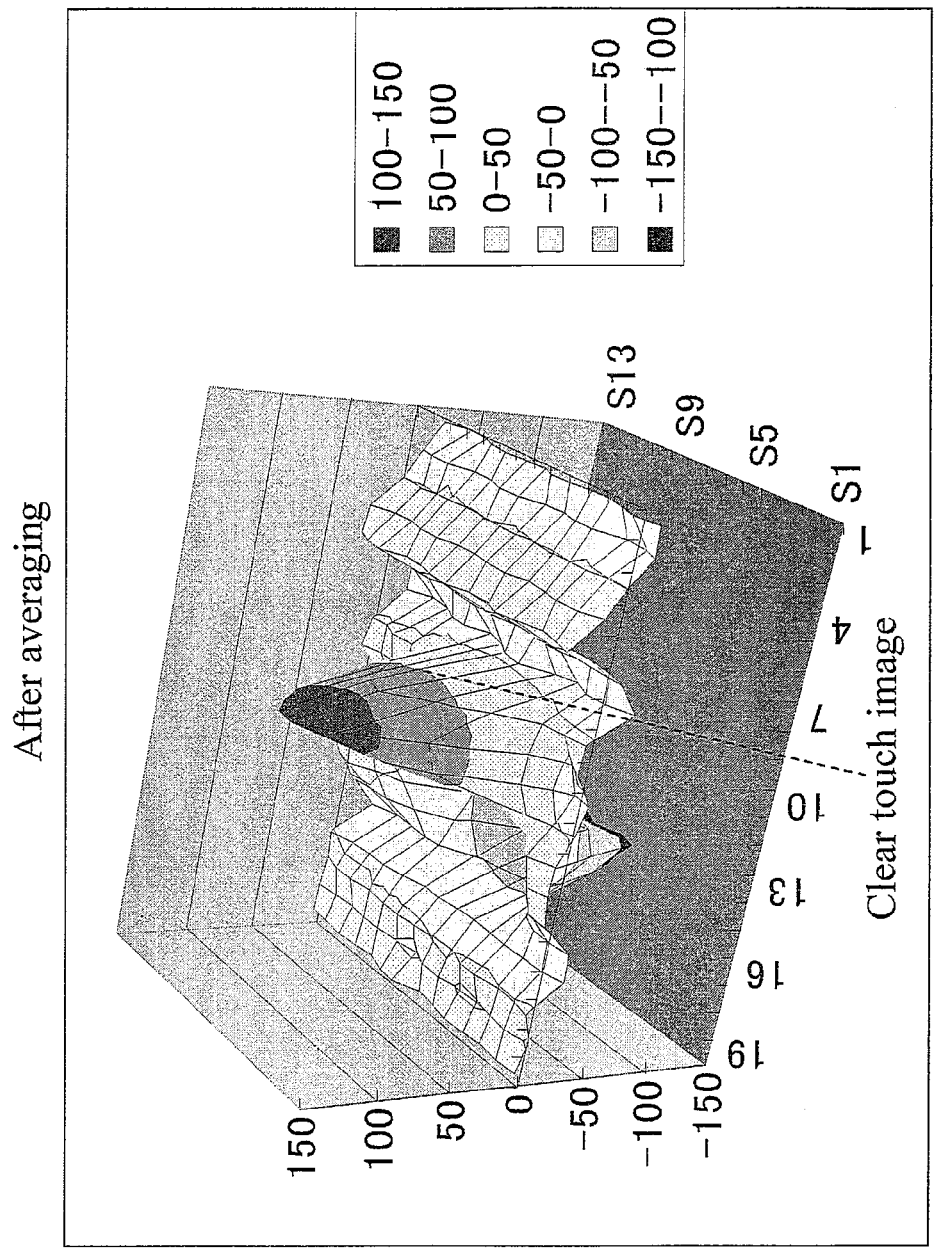
FIG. 8D shows a touch data after an average calculation.
Figure 9:
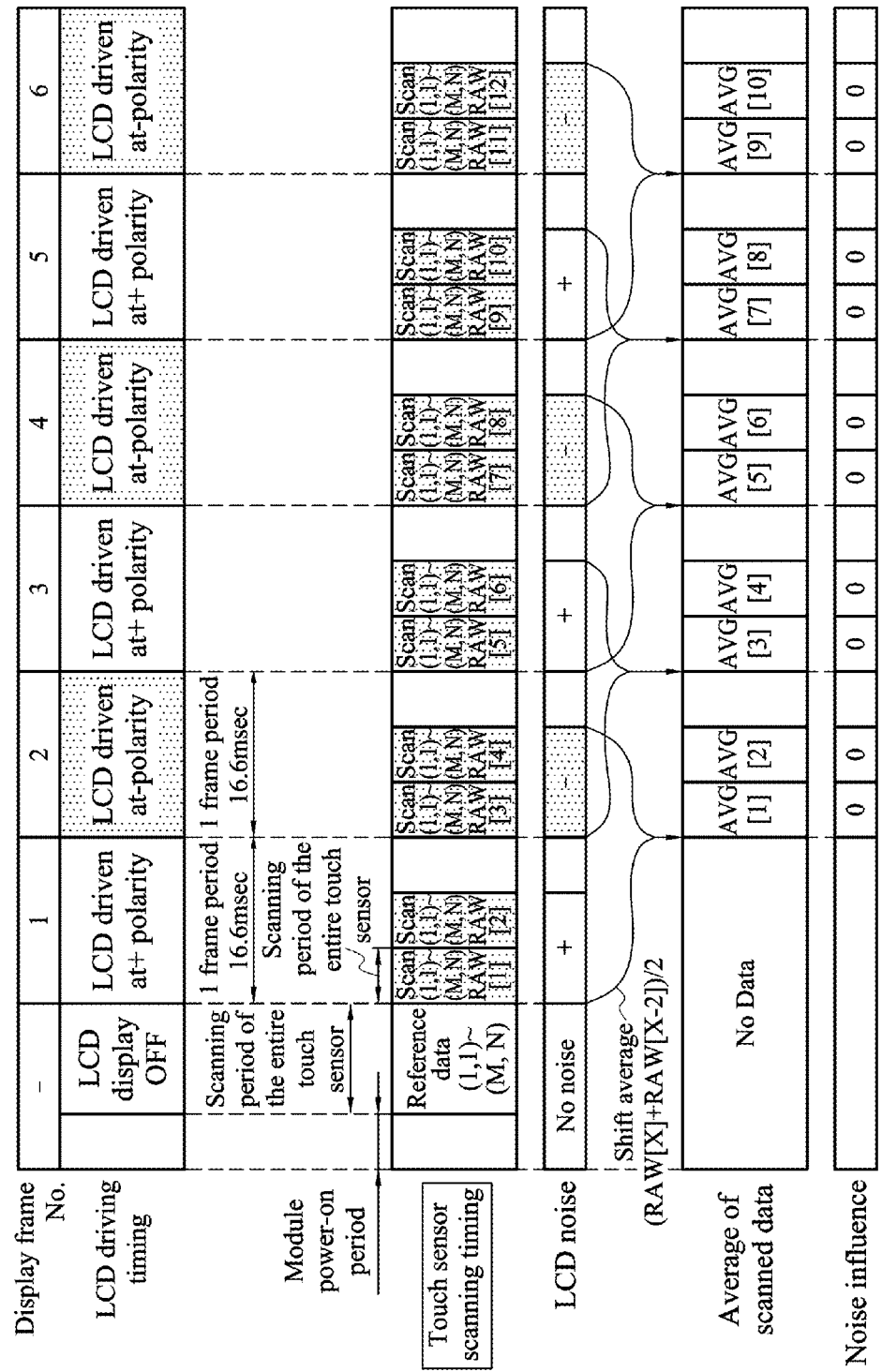
FIG. 9 is a diagram for describing the touch sensor and the driving method thereof in accordance with the Embodiment 2.

FIG. 8D shows a touch data wherein the noise is offset after calculation using Formula (1). As shown in FIG. 8D, a touch image with a high S/N ratio is acquired wherein noise not included in the touch image is offset Embodiment 2:

FIG. 9 is a diagram for describing the touch sensor and the driving method thereof in accordance with the Embodiment 2. FIG. 9 shows a timing chart having the same form as FIG. 6 of Embodiment 1. Elements in Embodiment 2 identical to elements in Embodiment 1 are marked with the same reference number, and the description thereof is omitted.

In FIG. 9, the frame and the driving timing of the LCD device 70 are the same as those in FIG. 6. In Embodiment 2, the beginning of the scanning timing of the touch sensor 10 synchronizing with the beginning of the frame of the LCD device 70 is the same as Embodiment 1. In Embodiment 2, the reading operation of the touch sensor 10 for touch data performed twice during a frame period is different from Embodiment 1. In general the reading period of the touch sensor 10 is shorter than 16.6 msec. For example, if the reading speed is set at higher than 120 Hz, as shown in FIG. 9, a complete surface scanning is performed twice in a frame.

In this case, two detection data are detected in each frame. Similarly, a shift average of two successive frames is also calculated to acquire a touch data without noise in this case. At this time, a shift average of two detection data detected in the same order in two frames is calculated, for example, a shift average of the detection data RAW[1] of the first frame and the detection data RAW[3] of the second frame, or a shift average of the detection data RAW[2] of the first frame and the detection data RAW[4] of the second frame. Namely, the shift average is calculated by (RAW[X]+RAW[X−2])/2.

The first frame is a period an image is being written in the LCD device 70. Therefore, in the case where an image is written from the top to bottom, the upper half of the image is written during the first half of the frame and the lower half of the image is written during the second half of the frame. If detection data of the touch sensor between images in an identical domain are not summed up, the synchronization in a frame cannot be achieved. In this case, two different data are summed up and the calculated detection data has no meaning. Therefore, a detection data average AVG[1] is calculated from a detection data RAW[1] first detected in the first frame and a detection data RAW[3] first detected in the second frame, and a detection data average AVG[2] is calculated from a detection data RAW[2] second detected in the first frame and a detection data RAW[4] second detected in the second frame. By the calculation, detection data averages AVG[1] and AVG[2] which are not influenced by the noise of the LCD device 70 can be achieved. Then the detection data averages AVG[1] and AVG[2] can be used as two touch data corresponding to the second frame or an average, which is (AVG[1]+AVG[2])/2, can be calculated to be one touch data corresponding to the second frame.

In the third frame and after the third frame, the same process is used to acquire a touch data accurately from a number of detection data. According to the touch panel and the driving method of Embodiment 2, two detection data in each frame are used to acquire accurate touch data.

For an average calculation, it is also possible to set an interval to calculate an average for each of predetermined frame, as described in Embodiment 1.

Figure 10:
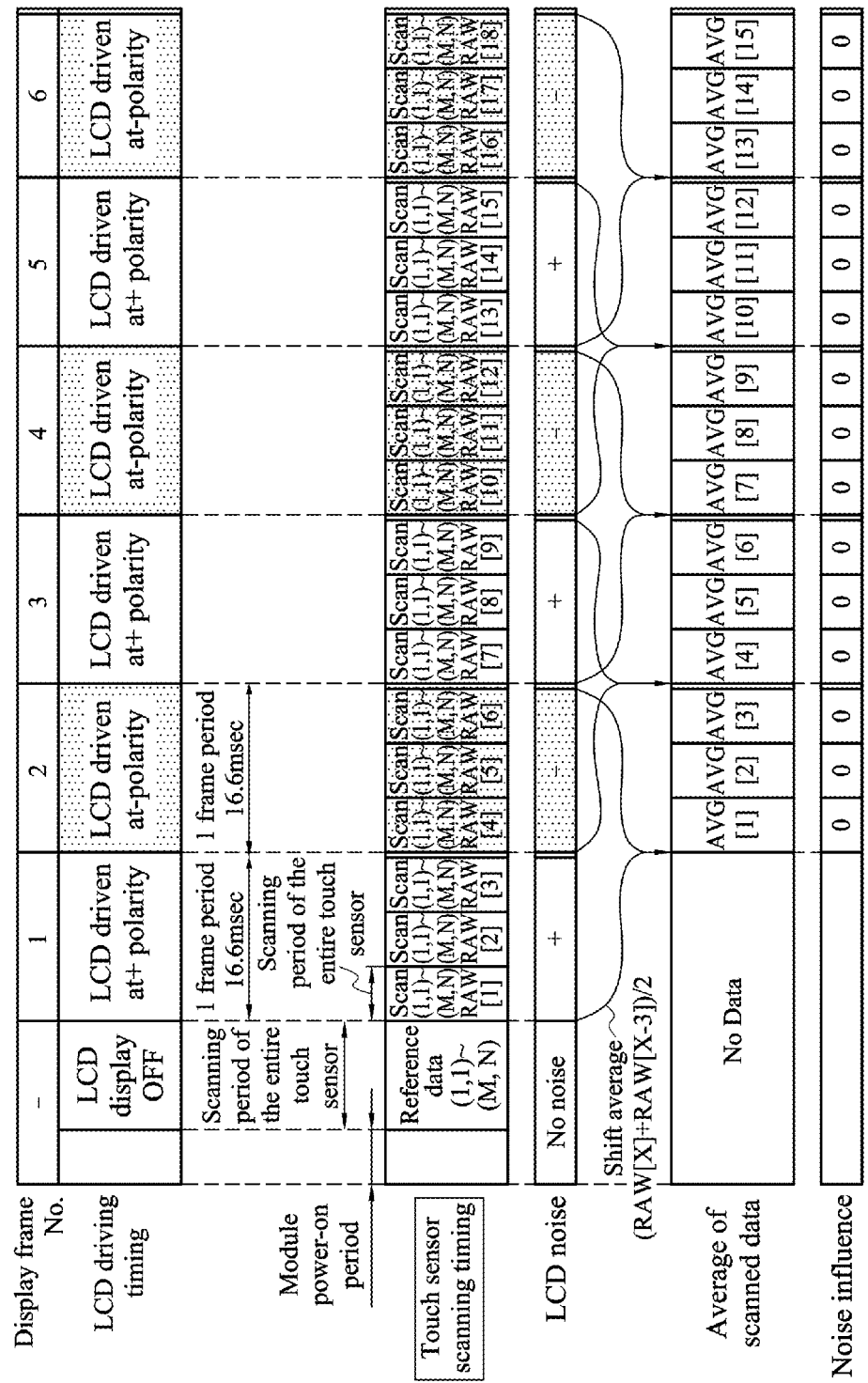
FIG. 10 is a diagram for describing the touch sensor and the driving method thereof in accordance with the Embodiment 3.

Embodiment 3:

FIG. 10 is a diagram for describing the touch sensor and the driving method thereof in accordance with the Embodiment 3. FIG. 10 shows a timing chart having the same form as FIG. 6 of Embodiment 1 and FIG. 9 of Embodiment 2.

In Embodiment 2, the reading operation is performed twice in a frame, but in Embodiment 3, the reading operation is performed three times during a frame. At this time, the reading speed of the reading part 22 is set at higher than 180 Hz. Therefore, as shown in FIG. 10, three detection data can be achieved within a frame.

It is the same as Embodiments 1 and 2 that the touch information calculation device 25 performs an average calculation to eliminate noise in two successive frames. As with the description for Embodiment 2, for each of the three detection data, a shift average is calculated by averaging two detection data which are detected in the same order in two successive frames respectively. Namely, a shift average is calculated by averaging the detection data RAW[1] of the first frame and the detection data RAW[4] of the second frame, a shift average is calculated by averaging the detection data RAW[2] of the first frame and the detection data RAW[5] of the second frame, and a shift average is calculated by averaging the detection data RAW[3] of the first frame and the detection data RAW[6] of the second frame. Thus, detection data averages without noise AVG[1], AVG[2], and AVG[3] are acquired and functions as three touch data in the second frame. The three detection data in a frame can be directly used in the follow-up calculation, but an average of the three detection data (AVG[1]+AVG[2]+AVG[3])/3 can also be calculated, if one frame just needs one touch data.

In the third frame and after the third frame, the same process is used to acquire three touch data in a frame. Thus, an accurate touch data can be achieved from a number of detection data.

That the touch sensor 10 scans twice in a frame is described in Embodiment 1, and that the touch sensor 10 scans three times during a frame is described in Embodiment 2. However, if the reading speed of the touch sensor 10 is faster, the scanning operation can be performed more times during a frame. For an average calculation, it is also possible to set an interval to calculate an average for each of predetermined frame, as described in Embodiments 1 and 2.

According to the touch panel and the driving method of Embodiments 2 and 3, an accurate touch data can be achieved by scanning the touch sensor 10 several times during a frame.

Figure 11:
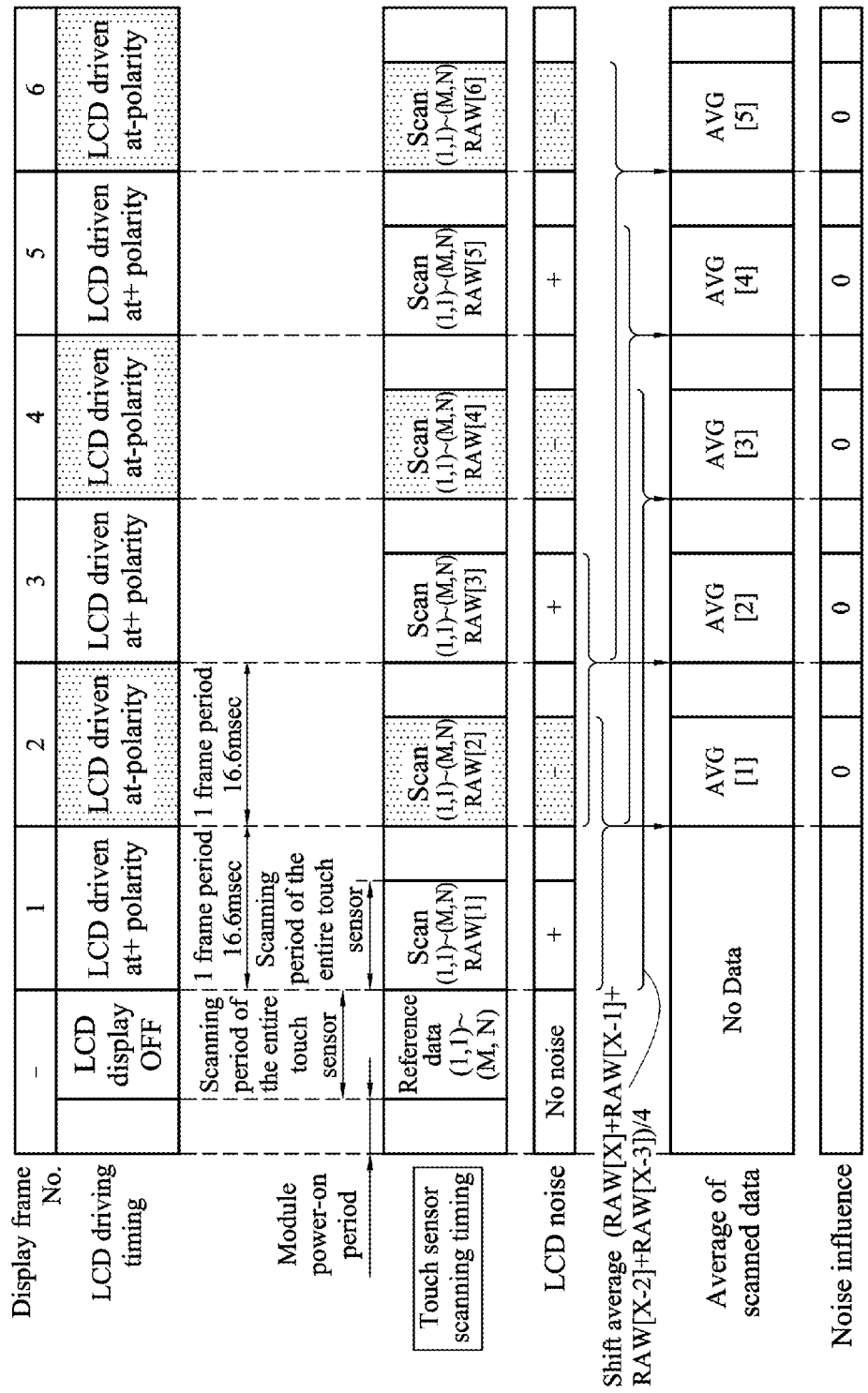
FIG. 11 is a diagram for describing the touch sensor and the driving method thereof in accordance with the Embodiment 4.

Embodiment 4:

FIG. 11 is a diagram for describing the touch sensor and the driving method thereof in accordance with the Embodiment 4. FIG. 11 shows a timing chart having the same form as FIG. 6 of Embodiment 1, FIG. 9 of Embodiment 2, and FIG. 10 of Embodiment 3.

In Embodiment 4, the scanning timing and detection method for touch data of the touch sensor 10 is identical to those in Embodiment 1. The calculation method for calculating detection data averages AVG[1] and ACG[2] corresponding to the second and third frames is also identical to that in Embodiment 1.

In the fourth frame in Embodiment 4, when a detection data average AVG[3] is calculated, a shift average of four detection data RAW[1], RAW[2], RAW[3], and RAW[4] detected respectively in the first to fourth frames is calculated. This point is different from Embodiment 1. The first frame is a positive driven frame, the second frame is a negative driven frame, the third frame is a positive driven frame, and the fourth frame is a negative driven frame. The number of positive driven frames is equal to the number of negative driven frames. In the LCD device 70 applied with frame inversion, the positive driven frame and the negative driven frame must be alternating, so concerning an even number of successive frames, the number of positive driven frames must be equal to the number of negative driven frames. Therefore, by calculating a detection data average with respect to equal to or more than four successive frames, the noise from the LCD device 70 can be offset and a touch data without noise can be achieved.

In FIG. 11, in the fifth frame and after the fifth frame, detection data averages AVG[4] and AVG[5] are also calculated by using detection data RAW[2] to RAW[5] and RAW[3] to RAW[6], respectively, which are detected in four successive frames. The formula for calculating the shift average is shown as Formula (2).

$$(RAW[X]+RAW[X-1]+RAW[X-2]+RAW[X-3])/4 \quad (2)$$

As mentioned before, by increasing the number of data to calculate an average, the accuracy of the average is raised and coupling noise, heat noise or etc. from the LCD device 70 is corrected.

In Embodiment 4, concerning the second frame and the third frame, in order not to reduce the number of detection data averages, detection data averages AVG[1] and AVG[2] are calculated from two successive frames, wherein the calculation method is equal to that of Embodiment 1. However, all average calculations of the touch sensor 10 can only use Formula (2) and the detection data average begins calculation in the fourth frame. Details of calculations are described above and can be set in various ways according to purpose.

According to the touch panel and driving method of Embodiment 4, by using an even number, above four, of detection data to calculate an average, the number of the sampling data is raised and an accurate touch data with less noise than before can be achieved.

In Embodiment 4, an even number, above four, of detection data are used to calculate an average. Though the number of all detection data is reduced, the accuracy for calculating an average of detection data is raised substantially and calculation burden is relieved.

Figure 12A:
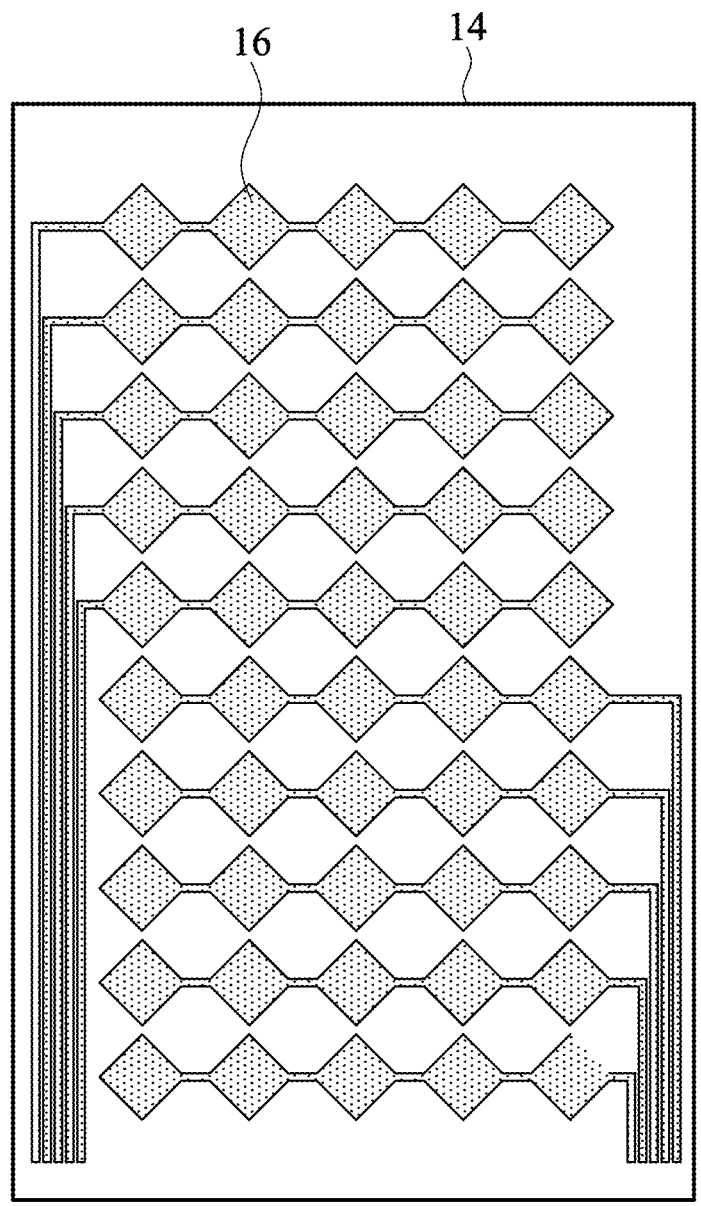
FIG. 12A is a plan view of an example of Y electrode layer of the touch sensor in accordance with the Embodiment 5.
Figure 12B:
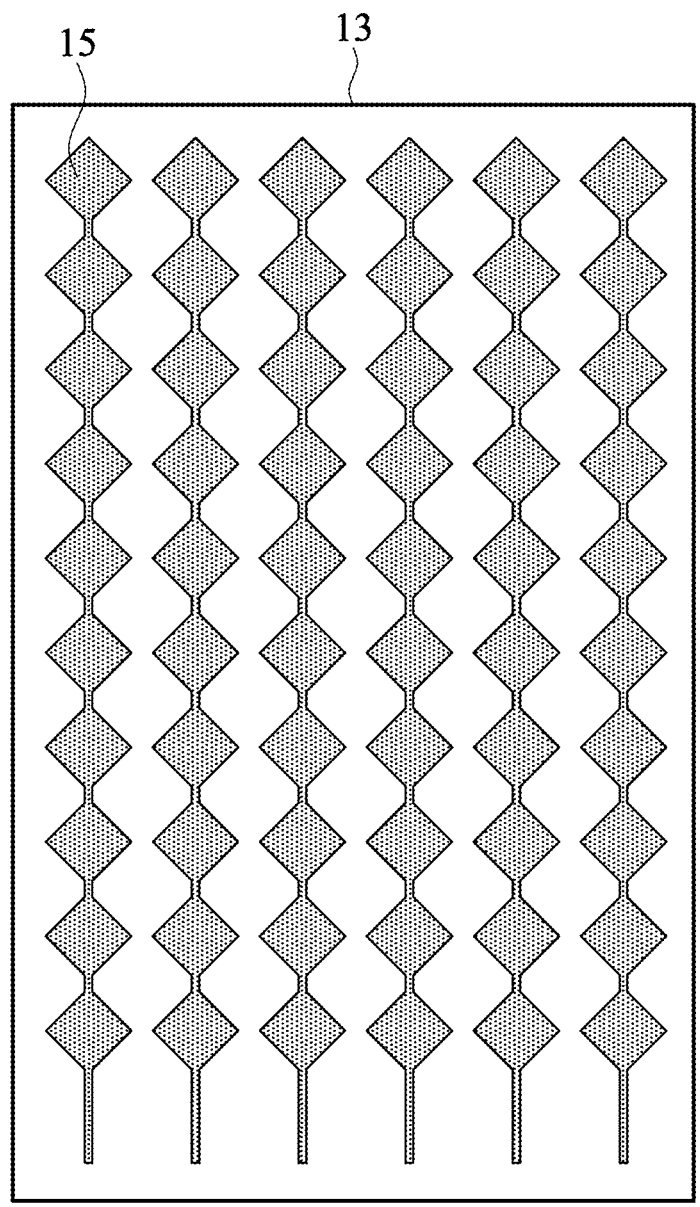
FIG. 12B is a plan view of an example of X electrode layer of the touch sensor in accordance with the Embodiment 5.

Embodiment 5:

FIG. 12 is a diagram showing an example of the electrode structure of the touch sensor in accordance with the Embodiment 5. FIG. 12A is a plan view of an example of Y electrode layer of the touch sensor in accordance with the Embodiment 5. FIG. 12B is a plan view of an example of X electrode layer of the touch sensor in accordance with the Embodiment 5.

In the FIGS. 2 and 3 of Embodiment 1, an example is described, where stripe-shaped X electrodes 11 and Y electrodes 12 form the input detection device. However, as shown in FIGS. 12A and 12B, an electrode line can be constructed by many small squares connected in series. In FIG. 12A, a Y electrode layer 14 comprising Y electrodes 16 constructed by many small squares connected in series along the horizontal direction is shown. In FIG. 12B, an X electrode layer 13 comprising X electrodes 15 constructed by many small squares connected in series along the vertical direction is shown. Both of the X electrodes 15 and Y electrodes 16 have electrode shapes different from the electrode shapes of the X electrodes 11 and Y electrodes 12 in FIGS. 2 and 3. However, a plurality of Y electrodes 16 are still parallel arranged along the horizontal direction in FIG. 12A, and a plurality of X electrodes 15 are still parallel arranged along the vertical direction in FIG. 12B. In view of the arrangement, the X electrodes 15 and Y electrodes 16 are the same as the X electrodes 11 and Y electrodes 12.

Figure 13A:
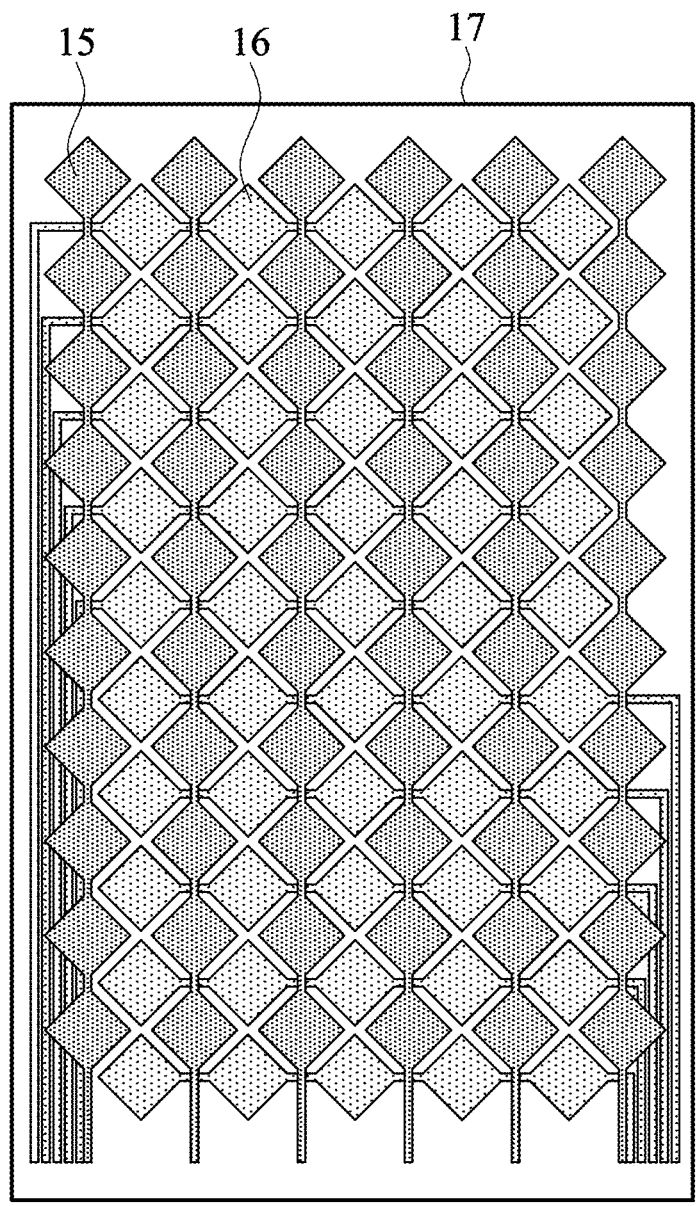
FIG. 13A is a plan view of an inner electrode layer of the touch sensor in accordance with the Embodiment 5.
Figure 13B:
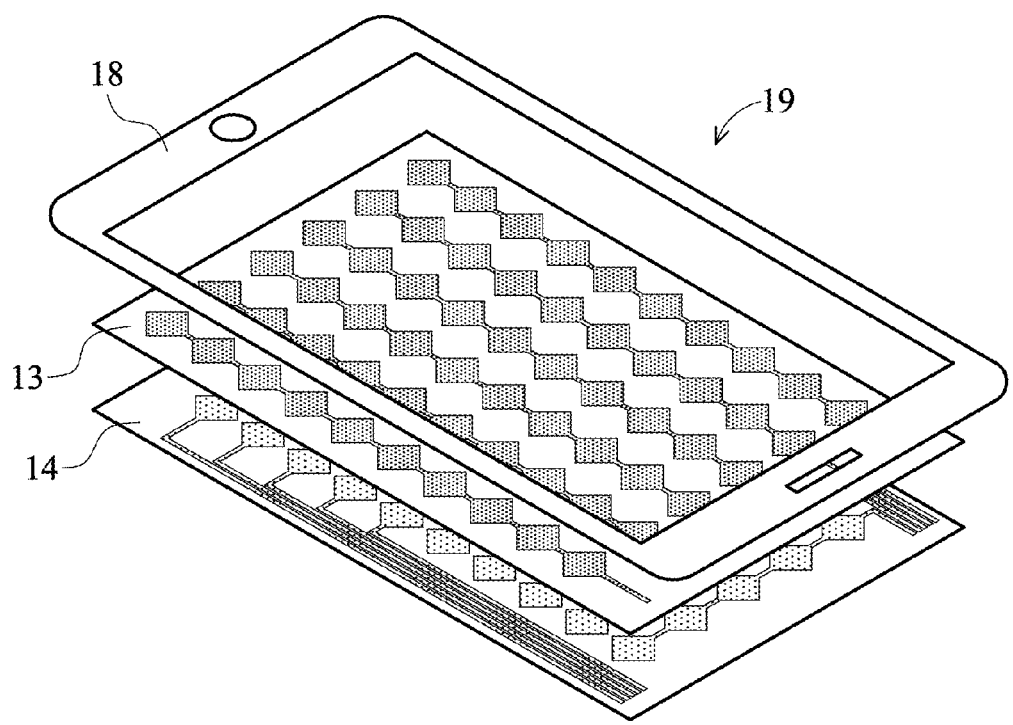
FIG. 13B is a stereogram showing the entire structure of the touch sensor in accordance with the Embodiment 5.

FIG. 13 is a diagram showing a structure of a touch sensor 19 in accordance with the Embodiment 5. FIG. 13A is a plan view of an inner electrode layer 17 of the touch sensor 19 in accordance with the Embodiment 5. FIG. 13B is a stereogram showing the entire structure of the touch sensor 19 in accordance with the Embodiment 5.

In FIG. 13A, a plan view of the electrode layer 17 is shown. The arrangement for the X electrodes 15 and the Y electrodes 16 make the small squares not overlap with each other, so that the surface area of the electrodes could be increased.

In FIG. 13B, the entire structure of the touch sensor 19 is shown. After the Y electrode layer 14 and the X electrode layer 13 are layered, a glass cover 18 is disposed above the surface. The touch sensor 19 provided with this structure can be used to form a touch panel of the invention.

Note that both the inner electrode structure and the external structure of the touch sensor 10 or 19 can adopt various kinds of structures according to purpose. Various kinds of the touch sensor 10 or 19 can form a touch panel with less noise.

Figure 14:
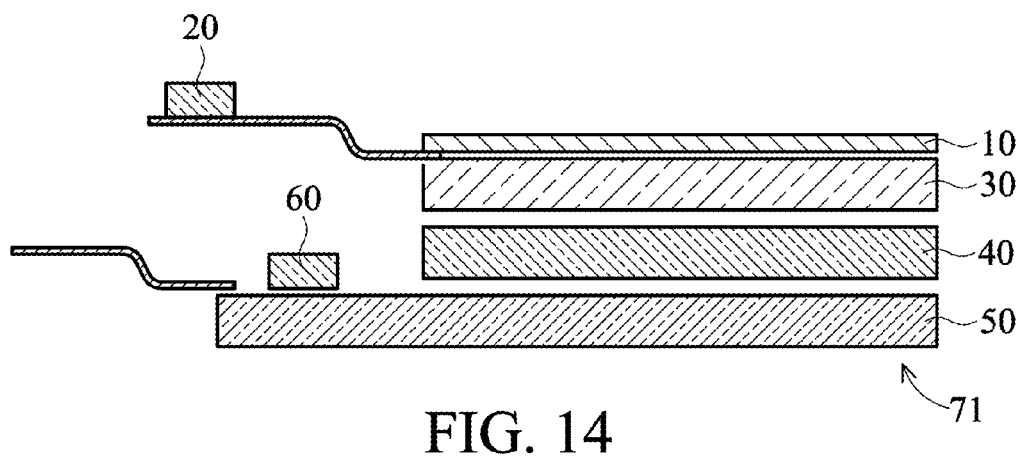
FIG. 14 a section view of an exemplary structure of a touch panel in accordance with the Embodiment 6.

Embodiment 6:

FIG. 14 a section view of an exemplary structure of a touch panel in accordance with the Embodiment 6. In FIG. 14, the touch panel of Embodiment 6 comprises a touch sensor 10, a touch sensor controller 20, a touch sensor glass 30, a color filter glass 40, an array glass 50, and an LCD driving circuit 60. The touch sensor 10, the touch sensor controller 20, and the touch sensor glass 30 form a touch sensor module. The color filter glass 40, the array glass 50, and the LCD driving circuit 60 form an LCD device 71.

In the touch panel of Embodiment 6, the touch sensor 10 is not disposed in the LCD device 71. The touch sensor 10 formed by transparent electrode layers such as an ITO is disposed on the sensor glass 30 disposed on the color filter glass 40. Namely, the touch panel of Embodiment 6 is different from the in-cell touch panel of Embodiment 1 shown in FIG. 1. The touch panel of Embodiment 6 is a structure wherein an independent touch sensor module which is a discrete object is disposed on the LCD device 71.

In this way, the touch panel of Embodiment 6 can be a structure wherein the touch sensor module and the LCD device 71 are independent. Generally, in the touch panel with independent modules like this, a shied effect has been raised because the touch sensor glass 30 is disposed between the touch sensor 10 and the color filter glass 40. However if the noise from the LCD device 71 is strong, the touch panel and the driving method of the invention can still be utilized to acquire touch data with less noise.

Embodiment 7:

As a modification of Embodiment 6, an on-cell touch panel can be adopted, wherein the touch sensor glass 30 shown in FIG. 14 is removed and the touch sensor 10 is formed directly on the color filter glass 40. In the on-cell touch panel, although the color filter glass 40 is disposed between the touch sensor 10 and the array glass 50, the touch sensor 10 is still easily influenced by the operation of the transistors on the array glass 50. Therefore, the invention is also suitable for the on-cell touch panel to acquire touch data with a high S/N ratio.

As described above, the touch panel and the driving method of the invention can be applied to touch panels having many kinds of structures, wherein the touch sensor is influenced by the noise from the LCD device. Thus, touch information with less noise and a high S/N ratio can be achieved.

While the invention has been described by way of example and in terms of the preferred embodiments, it is to be understood that the invention is not limited to the disclosed embodiments. Therefore, the scope of the appended claims should be accorded the broadest interpretation so as to encompass all such modifications and similar arrangements.

For example, in the embodiments, the display device is an LCD device, but as long as the display device is a display device of which the pixels are driven by alternating voltage changing its polarity every frame, many kinds of display devices are allowable.

The invention can be fully applied in a touch panel of which the input interface is used to display images and to receive touch inputs by fingers or etc.

What is claimed is:

1. A touch panel comprising:
   a display driven by an alternating voltage;
   a touch sensor that has touch data read from an input interface of the touch sensor,
   a touch data detection part that synchronizes a reading operation of the entire input interface of the touch sensor with a frame of the display and detects the touch data in each frame, wherein the period of the reading operation overlaps a display period in the frame; and
   a touch data calculation part that calculates an average of the touch data, from the reading operation of N successive frames, to get a calculated touch data corresponding to a predetermined frame, wherein N is an even number,
   wherein the reading operation is an operation to read the touch data from the input interface at least twice during each frame of the N successive frames, and,
   wherein the touch data calculation part calculates the average from the touch data that are detected in one of the at least two operations to read the touch data from the input interface during each frame of the N successive frames and that are in the same sequence in each frame of the N successive frames.

2. The touch panel as claimed in claim 1, wherein the reading operation is an operation to sequentially scan each electrode line of a plurality of electrode lines that are arranged in a matrix form to detect the touch data.

3. The touch panel as claimed in claim 1, wherein the touch sensor is an electrostatic capacitive touch sensor.

4. The touch panel as claimed in claim 1, wherein the touch panel is an in-cell touch panel, and the touch sensor is embedded into the display.

5. The touch panel as claimed in claim 1, wherein the touch panel is an on-cell touch panel, and the touch sensor is disposed on the display.

6. The touch panel as claimed in claim 1, wherein the touch sensor is a discrete object formed on a touch sensor glass, wherein the discrete object is disposed on the display.

7. The touch panel as claimed in claim 1, wherein the display is an LCD device.

8. A driving method for a touch panel comprising:
   providing a display with an alternating voltage;
   reading touch data from an input interface of a touch sensor,
   a touch data detection step that synchronizes a reading operation of the entire input interface of the touch sensor with a frame of the display and detects the touch data in each frame, wherein the period of the reading operation overlaps a display period in the frame; and
   a touch data calculation step that calculates an average of the touch data, from the reading operation of N successive frames, to get a calculated touch data corresponding to a predetermined frame, wherein N is an even number,
   wherein the reading operation is an operation to read the touch data from the input interface at least twice during each frame of the N successive frames, and
   wherein at the touch data calculation step the average is calculated from the touch data that are detected in one of the at least two operations to read the touch data from the input interface during each frame of the N successive frames and that are in the same sequence in each frame of the N successive frames.

9. The driving method as claimed in claim 8, wherein the reading operation is an operation to sequentially scan each electrode line of a plurality of electrode lines that are arranged in a matrix form to detect the touch data.

10. The driving method as claimed in claims 8, wherein the touch sensor is an electrostatic capacitive touch sensor.

* * * * *